(12) United States Patent
Chen et al.

(10) Patent No.: US 8,897,488 B2
(45) Date of Patent: Nov. 25, 2014

(54) BODY GESTURE CONTROL SYSTEM FOR OPERATING ELECTRICAL AND ELECTRONIC DEVICES

(75) Inventors: Chao-Lieh Chen, Kaohsiung (TW);
Chueh-Han Lo, Kaohsiung (TW);
Chin-Wei Ho, Kaohsiung (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 434 days.

(21) Appl. No.: 13/004,091

(22) Filed: Jan. 11, 2011

(65) Prior Publication Data

US 2011/0170745 A1 Jul. 14, 2011

(30) Foreign Application Priority Data

Jan. 13, 2010 (TW) .............................. 99100855 A

(51) Int. Cl.
*G06K 9/00* (2006.01)
*G06F 3/042* (2006.01)
*G06F 3/0488* (2013.01)
*G06F 3/01* (2006.01)

(52) U.S. Cl.
CPC ............ *G06K 9/00342* (2013.01); *G06F 3/042* (2013.01); *G06F 3/0488* (2013.01); *G06F 3/017* (2013.01)
USPC ....................................................... 382/103

(58) Field of Classification Search
CPC ....... G06F 3/017; G06F 3/042; G06F 3/0488; G06K 9/00342
USPC .......................................................... 382/103
See application file for complete search history.

(56) References Cited

U.S. PATENT DOCUMENTS

| 5,594,463 A | 1/1997 | Sakamoto |
| 6,002,808 A | 12/1999 | Freeman |
| 2009/0079813 A1* | 3/2009 | Hildreth ..................... 348/14.03 |
| 2009/0217211 A1* | 8/2009 | Hildreth et al. ............... 715/863 |

\* cited by examiner

*Primary Examiner* — Tom Y Lu
(74) *Attorney, Agent, or Firm* — Alan D. Kamrath

(57) ABSTRACT

A body gesture control system for operating electrical and electronic devices includes an image sensor device and an image processor device to process body gesture images captured by the image sensor device for recognizing the body gesture. The image processor device includes an image calculation unit and a gesture change detection unit electrically connected therewith. The image calculation unit is used to calculate gesture regions of the captured body gesture images and the gesture change detection unit is operated to detect changes of the captured body gesture images and to thereby determine a body gesture recognition signal.

20 Claims, 3 Drawing Sheets

BODY GESTURE CONTROL SYSTEM FOR OPERATING ELECTRICAL AND ELECTRONIC DEVICES

BACKGROUND OF THE INVENTION

1. Field of the Invention

The present invention relates to a body gesture control system for operating electrical and electronic devices. More particularly, the present invention relates to the body gesture control system provided with a gesture change detection unit for operating electrical and electronic devices.

2. Description of the Related Art

In general, remote signaling devices with infrared or RF signals are widely used to control functions of various electrical and electronic devices, including electrical machines, VCRs, TVs and computer devices. However, there is a requirement for freehand control to interact with the electrical and electronic devices. Moreover, voice or hand gesture signals can also be used to control functions of electrical and electronic devices.

By way of example, U.S. Pat. No. 5,594,463, entitled "HAND GESTURE MACHINE CONTROL SYSTEM," discloses a system for the control from a distance of machines having displays and including hand gesture detection in which the hand gesture causes movement of an on-screen hand icon over an on-screen machine control icon, with the hand icon moving the machine control icon in accordance with sensed hand movements to effectuate machine control. TV control led by hand signals includes detecting a single hand gesture and providing a hand icon on the screen along with the provision of icons representing TV controls such as volume, channel, color, density, etc. A television camera detects the hand in a noisy background through correlation techniques based on values of local image orientation. In order to trigger the system into operation, a trigger gesture such as the "how" sign is distinguished from the background through the utilization of orientation angle differences. However, the control system is designed for the control of on-screen hand icons by a hand gesture that fails to meet a requirement for reducing mis-recognition of gestures.

Furthermore, U.S. Pat. No. 6,002,808, entitled "HAND GESTURE CONTROL SYSTEM," discloses a system is provided for rapidly recognizing hand gestures for the control of computer graphics. Particularly, image moment calculations are utilized to determine an overall equivalent rectangle corresponding to hand position, orientation and size, with size correlating to the width of the hand. A hole generated through the utilization of the touching of the forefinger with the thumb provides a special trigger gesture recognized through the corresponding hole in the binary representation of the hand. Image moments of images of other objects are detected for controlling or directing onscreen images. However, the control system is also designed for the control of onscreen images by a hand gesture that fails to meet a requirement for reducing mis-recognition of gestures.

As is described in greater detail below, the present invention provides a body gesture control system for operating electrical and electronic devices. A gesture change detection unit is provided to process body gesture images to precisely recognize a body gesture in such a way as to mitigate and overcome the above problem.

SUMMARY OF THE INVENTION

The primary objective of this invention is to provide a body gesture control system for operating electrical and electronic devices. An image processor device is used to process body gesture images with a gesture change detection unit to precisely recognize a body gesture. Accordingly, the body gesture control system is successful in reducing the possibility of mis-recognition among various types of the body gestures.

The hand gesture control system in accordance with an aspect of the present invention includes:

an image sensor device used to capture and generate at least two body gesture images of a user; and an image processor device being in communication with the image sensor device for receiving image data, the image processor device being operated to process the captured body gesture images for recognizing the body gesture, the image processor device including:

an image calculation unit calculating gesture regions of the captured body gesture images;

a gesture change detection unit electrically connected with the image calculation unit, the gesture change detection unit being operated to detect changes of the captured body gesture images and to thereby determine a body gesture recognition signal; and a signal transmission unit electrically connected with the gesture change detection unit, the signal transmission unit used to output the body gesture recognition signal received from the gesture change detection unit.

In a separate aspect of the present invention, the image sensor device is selected from a CCD or a CMOS.

In a further separate aspect of the present invention, the image calculation unit is selected from an image gradient calculation/binaryzation unit.

In yet a further separate aspect of the present invention, the image gradient calculation/binaryzation unit utilizes an edge detection method to detect an edge and to thereby calculate a gradient and a motion vector.

In yet a further separate aspect of the present invention, the edge detection method is implemented by a Sobel operator or a Laplacian operator.

In yet a further separate aspect of the present invention, the gesture change detection unit includes a trajectory calculation unit to calculate a gesture trajectory and a gesture direction, and further includes a gesture-judging unit to judge the gestures.

In yet a further separate aspect of the present invention, the gesture change detection unit further includes a line-of-sight angle calculation unit to calculate a user's sight angle.

In yet a further separate aspect of the present invention, the gesture change detection unit includes a skin-color filter array to detect a skin-color region.

In yet a further separate aspect of the present invention, the skin-color filter array is selected from a band-pass filter.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a body gesture control system for operating electrical and electronic devices in accordance with the preferred embodiments of the present invention is applicable for various devices, including electrical machines, VCRs, TVs and computer devices, which are not limitative of the present invention.

Throughout the specification, unless the context requires otherwise, the technical terms, as used herein, have the same meaning as one of ordinary skill commonly known in the art. The term body gesture means a gesture using body parts, including hands, fingers, head, lips, eyes, etc.

Figure 1:
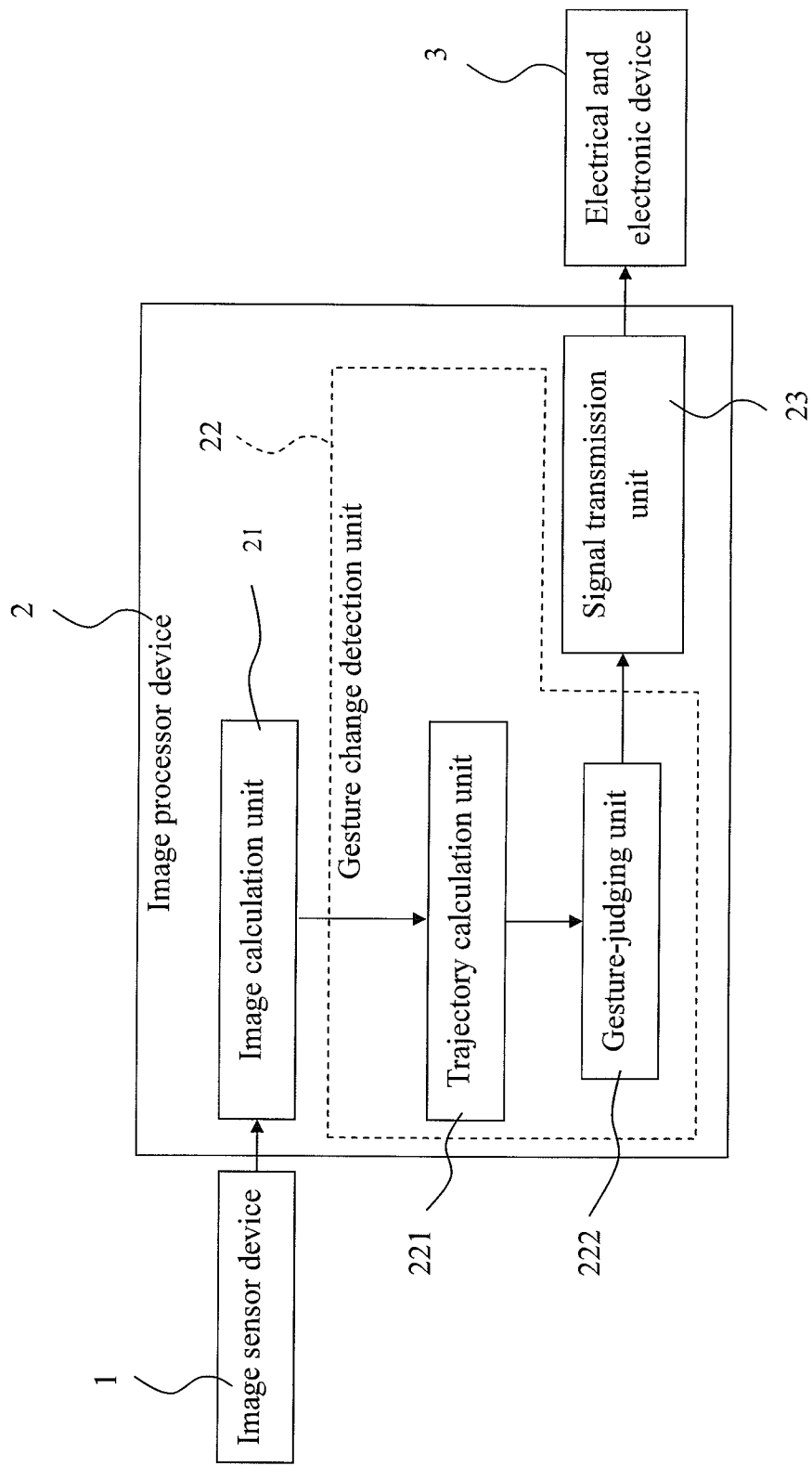
FIG. 1 is a schematic view of a body gesture control system for operating electrical and electronic devices in accordance with a first embodiment of the present invention.

FIG. 1 shows a schematic view of a body gesture control system corresponding with an operating electrical and electronic device in accordance with a first embodiment of the present invention. Referring initially to FIG. 1, a body gesture control system includes an image sensor device 1 and an image calculation unit 2 electrically connected therewith. The image calculation unit 2 of the body gesture control system further corresponds with an electrical and electronic device 3 such that a user can operate the body gesture control system to control the electrical and electronic device 3.

With continued reference to FIG. 1, the image sensor device 1 is used to capture and generate at least two body gesture images of a user. In a preferred embodiment, the image sensor device 1 is selected from a CCD, a CMOS or the like. The image sensor device 1 may electrically connect with the image calculation unit 2 or may be in wireless communication with the image calculation unit 2.

Still referring to FIG. 1, the image calculation unit 2 may be formed as an IC chip functioned to convert image data received from the image sensor device 1 into an image-processed signal for operating the electrical and electronic device 3. The image calculation unit 2 includes an image calculation unit 21, a gesture change detection unit 22 and a signal transmission unit 23 which may be provided in the IC chip.

Still referring to FIG. 1, the image calculation unit 21 is operated to process the captured body gesture images for recognizing the user's body gesture. In a preferred embodiment, the image calculation unit 21 is selected from an image gradient calculation/binaryzation unit. The image gradient calculation/binaryzation unit utilizes an edge detection method to detect an edge and to thereby calculate a gradient (known as focus value, FV) and a motion vector of the captured body gesture image. By way of example, the edge detection method is implemented by a gradient calculation operator, for example: a Sobel operator or a Laplacian operator, operating on object portions of an image frame and/or separately operating on object portions of at least two distinct image frames.

Assume that the size of the body gesture image consists of M scanned lines and N scanned lines, namely a M×N determinant. The body gesture image is given by an $I_{M \times N}$ matrix with gray level pixels I(x, y), where (x, y) is coordinates of pixels, $1 \leq x \leq M$, $1 \leq y \leq N$.

A Sobel operator is expressed as $$\sigma_x = \begin{bmatrix} 1 & 0 & -1 \\ 2 & 0 & -2 \\ 1 & 0 & -1 \end{bmatrix}, \sigma_y = \begin{bmatrix} 1 & 2 & 1 \\ 0 & 0 & 0 \\ -1 & -2 & -1 \end{bmatrix}$$

To calculate gradients in the x direction and the y direction of the edges of a 3×3 grid, the gradient can be written in the form $$[s_x(x, y)]_{3 \times 3} =$$
$$\sigma_x \times I_{3 \times 3} = \begin{bmatrix} 1 & 0 & -1 \\ 2 & 0 & -2 \\ 1 & 0 & -1 \end{bmatrix} \begin{bmatrix} I(x, y) & I(x+1, y) & I(x+2, y) \\ I(x, y+1) & I(x+1, y+1) & I(x+2, y+1) \\ I(x, y+2) & I(x+1, y+2) & I(x+2, y+2) \end{bmatrix}$$

$$[s_y(x, y)]_{3 \times 3} = \sigma_y \times I_{3 \times 3} =$$
$$\begin{bmatrix} 1 & 2 & 1 \\ 0 & 0 & 0 \\ -1 & -2 & -1 \end{bmatrix} \begin{bmatrix} I(x, y) & I(x+1, y) & I(x+2, y) \\ I(x, y+1) & I(x+1, y+1) & I(x+2, y+1) \\ I(x, y+2) & I(x+1, y+2) & I(x+2, y+2) \end{bmatrix}$$

With the notations Sobel_X(x, y) and Sobel_Y(x, y), the matrix of gradients of the body gesture image can be expressed as $$\text{Sobel\_X} = [\text{Sobel\_X}(x, y)]_{M \times N} = \left[ \sum_{i=x}^{x+2} \sum_{j=y}^{y+2} s_x(i, j) \right]_{M \times N}$$

$$\text{Sobel\_Y} = [\text{Sobel\_Y}(x, y)]_{M \times N} = \left[ \sum_{i=x}^{x+2} \sum_{j=y}^{y+2} s_y(i, j) \right]_{M \times N}$$

In judging gradients in the x direction and the y direction of the edges of the 3×3 grid, two thresholds (two gradient values (i.e., focus value, FV)) are utilized to compare with gradients of Sobel_X(x, y) and Sobel_Y(x, y). In a FV binaryzation, the M×N matrix Sobel_show_data of the body gesture image is given by Sobel_show_data=[Sobel_show_data(x,y)]$_{M \times N}$=
[D(96<Sobel_X(x,y)<224)or D(96<
Sobel_Y(x,y)<224)]$_{M \times N}$ where D is a logic judgment operator.

The M×N matrix Sobel_show_data of the body gesture image can be expressed as a binary matrix and written in the form buf_t1=[buf_t1(x,y)]$_{M \times N}$=Sobel_show_data(t−1)

where t is currently capturing time and t−1 is previously capturing time.

With continued reference to FIG. 1, the gesture change detection unit 22 includes a trajectory calculation unit 221 to calculate a gesture trajectory and a gesture direction, and further includes a gesture judging unit 222 to judge the gestures. In a preferred embodiment, the gesture change detection unit 22 includes a skin-color filter array, which may be selected from a band-pass filter, to detect a skin-color region prior to trajectory calculation.

In calculating the gradient binary matrix, the sum of detection results in the x direction with 8 points (from x to x−7) can be expressed in the form $$\text{eye\_shift\_sum\_data}(x, y) = \sum_{i=x-7}^{x} (\text{Sobel\_show\_data}(t)(i, y) \text{ XOR Sobel\_show\_data}(t-1)(i, y))$$

the sum in the y direction can then be expressed in the form $$\text{eye\_buf\_sum}(x, y) = \sum_{j=0}^{8/c-1} \text{eye\_shift\_sum\_data}(x, y-cj) = \sum_{j=y-8/c-1}^{y} \text{eye\_shift\_sum\_data}(x, j)$$

where eye_buf_sum(x, y) is total moving points.

By way of example, chroma components cb and cr received from the captured body gesture image of the image sensor device 1 to detect skin color utilized in the skin-color filter are in the form $$\text{cb\_show\_en}(x, y) = \begin{cases} 1, & \text{if } (110 < cb(x, y) < 129) \\ 0, & \text{others} \end{cases}$$

$$\text{cr\_show\_en}(x, y) = \begin{cases} 1, & \text{if } (130 < cr(x, y) < 149) \\ 0, & \text{others} \end{cases}$$

then from which, when y is odd, the logically judging result buf_show(x, y) is in the form buf_show($x,y$)=$D$(20<eye_buf_sum($x,y$))AND $D$($Cb\_$show$\_en$($x,y$)=1)AND $D$($Cr\_$show$\_en$($x,y$)=1)

when y is even, the logically judging result is in the form buf_show_data=buf_show($x,y-1$)

In trajectory calculation, by way of example, coordinates of the left hand are expressed in the form FT_LEFT_range_X_temp =

$$D\left[\sum_{x=1}^{M}\sum_{y=1}^{N}\text{buf\_show}(x, y) = 2^c\right]\left[\sum_{x=1}^{M}\sum_{y=1}^{N} x \times \text{buf\_show}(x, y)\right]$$

FT_LEFT_range_Y_temp =

$$D\left[\sum_{x=1}^{M}\sum_{y=1}^{N}\text{buf\_show}(x, y) = 2^c\right]\left[\sum_{x=1}^{M}\sum_{y=1}^{N} y \times \text{buf\_show}(x, y)\right]$$

The judgment operator D is used to determine whether an amount of skin-color pixels is greater than $2^c$. If the skin-color pixels are greater, $2^c$ pixels are taken into account for average coordinate calculations. After modified, these coordinates become $x_c^{(l)}$=$FT\_LEFT\_show\_X\_temp$=$FT\_LEFT\_range\_X\_temp$>>$c$ $y_c^{(l)}$=$FT\_LEFT\_show\_Y\_temp$=$FT\_LEFT\_range\_Y\_temp$>>$c$ where >>c means that c bits are rounded off.

In the center of trajectory point ($x_c^{(l)}$, $y_c^{(l)}$), within the range of 120×120 pixels, and since these conditions take the form $x_L^{(l)}=x_c^{(l)}-60, x_R^{(l)}=x_c^{(l)}+60$ $y_U^{(l)}=y_c^{(l)}-60, y_D^{(l)}=y_c^{(l)}+60$ the coordinates (x, y) become in the form FT_LEFT_range_X_temp =

$$D\left[\sum_{x=x_L^{(l)}}^{x_R^{(l)}}\sum_{y=y_U^{(l)}}^{y_D^{(l)}}\text{buf\_show}(x, y) = 2^c\right]\left[\sum_{x=x_L^{(l)}}^{x_R^{(l)}}\sum_{y=y_U^{(l)}}^{y_D^{(l)}} x \times \text{buf\_show}(x, y)\right]$$

FT_LEFT_range_Y_temp =

$$D\left[\sum_{x=x_L^{(l)}}^{x_R^{(l)}}\sum_{y=y_U^{(l)}}^{y_D^{(l)}}\text{buf\_show}(x, y) = 2^c\right]\left[\sum_{x=x_L^{(l)}}^{x_R^{(l)}}\sum_{y=y_U^{(l)}}^{y_D^{(l)}} y \times \text{buf\_show}(x, y)\right]$$

such that coordinates of the gesture trajectory are generated by the trajectory calculation unit 221. The judgment operator D is further used to determine whether an amount of skin-color pixels is greater than $2^c$. If the skin-color pixels are greater, $2^c$ pixels are taken into account for average coordinate calculations.

With continued reference to FIG. 1, the gesture judging unit 222 electrically connects with the trajectory calculation unit 221 to receive the gesture trajectory to judge the gestures. Furthermore, the signal transmission unit 23 electrically connects with the gesture-judging unit 222 of the gesture change detection unit 2. Consequently, the signal transmission unit 23 is used to output the body gesture recognition signal (i.e. control signal) received from the gesture change detection unit 22 to the preset electrical and electronic device 3.

Figure 2:
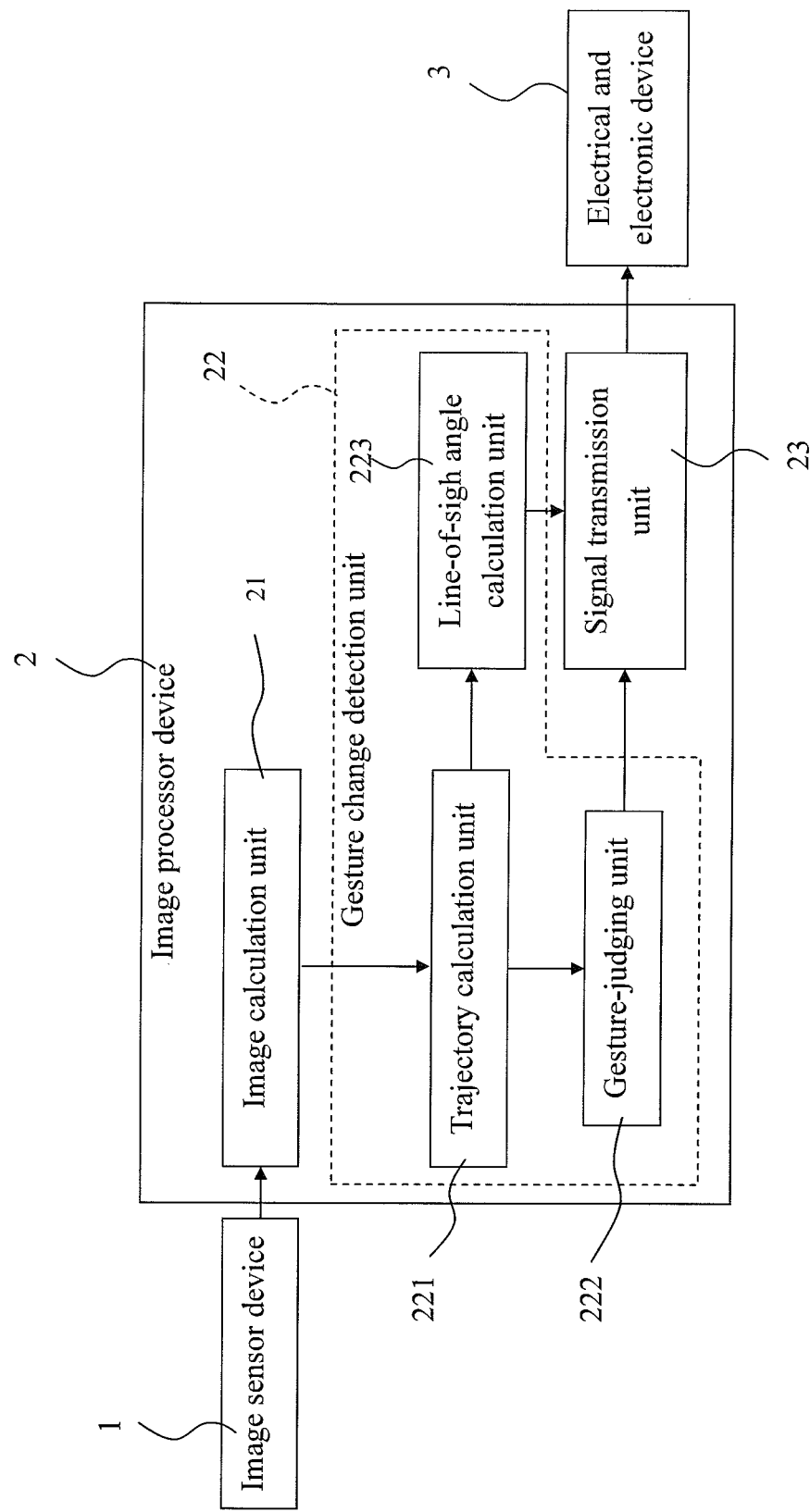
FIG. 2 is a schematic view of a body gesture control system for operating electrical and electronic devices in accordance with a second embodiment of the present invention, which is similar to FIG. 1.

Turning now to FIG. 2, a schematic view of a body gesture control system for operating electrical and electronic devices in accordance with a second embodiment of the present invention, which is similar to that in FIG. 1, is shown. In the second embodiment, the gesture change detection unit 22 further includes a line-of-sight angle calculation unit 223 to calculate a user's sight angle so that the body gesture control system is capable of determining a sight angle of the user's eye with respect to the designated electrical and electronic device 3.

In a preferred embodiment, the gesture change detection unit 22 is used to calculate displacements, velocities, accelerations and forces of the body gestures with respect to an image sensor frame (i.e. body gesture image) captured in a different time by the image sensor device 1 so that accurate movements of the body gestures can be successfully detected, as is described in greater detail below.

Figure 3A:
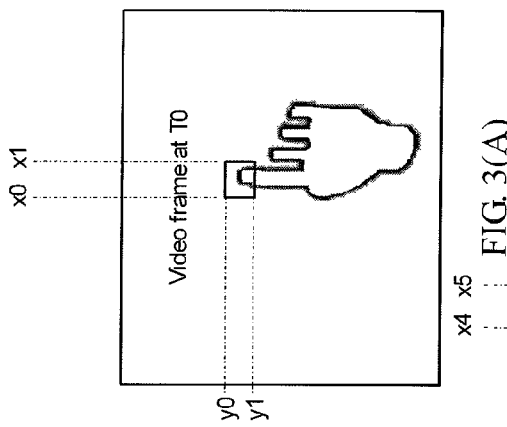
FIGS. 3(A)-3(C) are a series of schematic views of the body gesture control system for operating electrical and electronic devices applied on an image sensor frame in accordance with a preferred embodiment of the present invention.
Figure 3B:
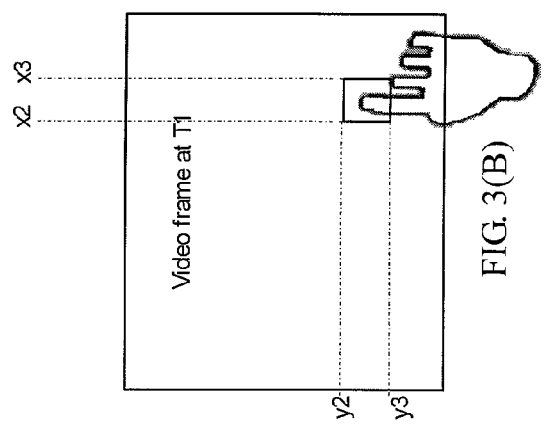
Figure 3C:
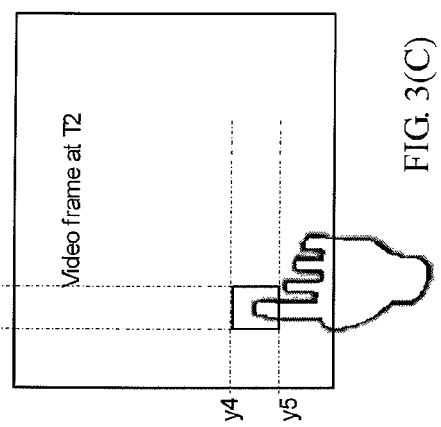

FIGS. 3(A)-3(C) are a series of schematic views of the body gesture control system for operating electrical and electronic devices applied on an image sensor frame in accordance with a preferred embodiment of the present invention. Referring to FIG. 3(A), a finger starts from a first position between ($x_0, y_0$) and ($x_1, y_1$) at T0, as best shown in FIG. 3(A), within an image sensor frame (i.e. video frame). Subsequently, the finger moves to a second position between ($x_2, y_2$) and ($x_3, y_3$) at T1, as best shown in FIG. 3(B). Finally, the finger further moves to a third position between (x4, y4) and (x5, y5) at T2, as best shown in FIG. 3(C).

To calculate movements from the first position T0 to the second position T1, the velocities of the finger touch region in the x direction are $$v_{left\text{-}edge}(T0 \to T1) = (x2-x0)/(T1-T0)$$

$$v_{right\text{-}edge}(T0 \to T1) = (x3-x1)/(T1-T0)$$

Similarly, the velocities of the finger touch region in the y direction are $$v_{upper\text{-}edge}(T0 \to T1) = (y2-y0)/(T1-T0)$$

$$v_{lower\text{-}edge}(T0 \to T1) = (y3-y1)/(T1-T0)$$

In addition, widths of the finger touch regions in the first and second positions are (x1−x0) and (x3−x2) in the x direction. Accordingly, changes of the widths of the finger touch regions in the x direction are approximately expressed in the form $$v_{width,x}(T0 \to T1) \approx [(x3-x2)-(x1-x0)]/(T1-T0)$$

Similarly, changes of the widths of the finger touch regions in the y direction are approximately expressed in the form $$v_{width,y}(T0 \to T1) \approx [(y3-y2)-(y1-y0)]/(T1-T0)$$

Therefore, from the second position T1 to the third position T2, the velocities and the changes of widths of the finger touch region in the x and y directions can also be expressed by $$v_{left\text{-}edge}(T1 \to T2) = (x4-x2)/(T2-T1)$$

$$v_{right\text{-}edge}(T1 \to T2) = (x5-x3)/(T2-T1)$$

$$v_{upper\text{-}edge}(T1 \to T2) = (y4-y2)/(T2-T1)$$

$$v_{lower\text{-}edge}(T1 \to T2) = (y5-y3)/(T2-T1)$$

$$v_{width,x}(T1 \to T2) \approx [(x5-x4)-(x3-x2)]/(T2-T1)$$

$$v_{width,y}(T1 \to T2) \approx [(y5-y4)-(y3-y2)]/(T2-T1)$$

Then, the accelerations of the finger touch regions in the x and y directions are $$a_{left\text{-}edge}(T0 \to T2) = [v_{left\text{-}edge}(T1 \to T2) - v_{left\text{-}edge}(T0 \to T1)]/(T2-T0)$$

$$a_{right\text{-}edge}(T0 \to T2) = [v_{right\text{-}edge}(T1 \to T2) - v_{right\text{-}edge}(T0 \to T1)]/(T2-T0)$$

$$a_{upper\text{-}edge}(T0 \to T2) = [v_{upper\text{-}edge}(T1 \to T2) - v_{upper\text{-}edge}(T0 \to T1)]/(T2-T0)$$

$$a_{lower\text{-}edge}(T0 \to T2) = [v_{lower\text{-}edge}(T1 \to T2) - v_{lower\text{-}edge}(T0 \to T1)]/(T2-T0)$$

It is the fact that a force of the finger gesture acting in the x and y directions is proportional to an acceleration value of the finger touch region represented if the mass of the finger is approximately constant.

Similarly, the acceleration values of the finger touch regions in the z direction representing a force of the finger gesture are given as $$a_{width,x}(T0 \to T2) \approx [v_{width,x}(T1 \to T2) - v_{width,x}(T0 \to T1)]/(T2-T0)$$

$$a_{width,y}(T0 \to T2) \approx [v_{width,y}(T1 \to T2) - v_{width,y}(T0 \to T1)]/(T2-T0)$$

Accordingly, these above-mentioned equations are applied to calculate displacements, velocities, accelerations and forces of several body-part gestures, including finger-clicking gestures, clapping gestures, hand-waving gestures, nodding gestures and other body gestures. Preferably, the body gesture control system is used to simulate typewriting on a virtual keyboard or operating a virtual touch panel or mouse.

Although the invention has been described in detail with reference to its presently preferred embodiment(s), it will be understood by one of ordinary skill in the art that various modifications can be made without departing from the spirit and the scope of the invention, as set forth in the appended claims.

What is claimed is:

1. A body gesture control system for operating electrical and electronic devices, comprising:
    an image sensor device sequentially capturing and generating at least two body gesture images of a user in the form of image data, with the at least two body gesture images including at least two body part gesture images or at least two eye gesture images; and
    an image processor device in communication with the image sensor device and receiving the image data, with the image processor device processing the at least two body gesture images for recognizing body gestures, with the image processor device including:
    an image calculation unit calculating gesture regions of the at least two body gesture images; and
    a gesture change detection unit electrically connected with the image calculation unit, with the gesture change detection unit detecting changes of the at least two body gesture images and to thereby determine a body gesture recognition signal; wherein the gesture change detection unit calculates at least one displacement of the body gestures from a first position region between (x0, y0) and (x1, y1) shown in a first image frame of the at least two body gesture images captured at a first time (T0) to a second position region between (x2, y2) and (x3, y3) shown in a second image frame captured at a second time (T1) of the at least two body gesture images with the first and second position regions being different, with the first and second times (T0, T1) being different; and wherein the gesture change detection unit further calculates a differential between the first position region of the first image frame and the second position region of the second image frame of the at least two body gesture images and receiving a change of the gesture regions as the at least one displacement of the body gestures.

2. The body gesture control system for operating electrical and electronic devices as defined in claim 1, wherein the image calculation unit is selected from an image gradient calculation/binaryzation unit, and wherein the image gradient calculation/binaryzation unit detects an edge of the at least two body gesture images and to thereby calculate a gradient and a motion vector of the at least two body gesture images.

3. The body gesture control system for operating electrical and electronic devices as defined in claim 2, wherein the image gradient calculation/binaryzation unit is a gradient calculation operator, a Sobel operator or a Laplacian operator.

4. The body gesture control system for operating electrical and electronic devices as defined in claim 1, wherein the gesture change detection unit includes a trajectory calculation unit to calculate a gesture trajectory and a gesture direction, and further includes a gesture-judging unit to judge the gestures.

5. The body gesture control system for operating electrical and electronic devices as defined in claim 1, wherein the gesture change detection unit further includes a line-of-sight angle calculation unit to calculate a user's sight angle.

6. The body gesture control system for operating electrical and electronic devices as defined in claim 1, wherein the gesture change detection unit includes a skin-color filter array to detect a skin-color region.

7. The body gesture control system for operating electrical and electronic devices as defined in claim 1, wherein a signal transmission unit electrically connects with the gesture change detection unit with the signal transmission unit outputting the body gesture recognition signal received from the gesture change detection unit.

8. The body gesture control system for operating electrical and electronic devices as defined in claim 1, wherein the first position region is defined by a first set of a left edge, a right edge, a lower edge and an upper edge and the second position region is defined by a second set of a left edge, a right edge, a lower edge and an upper edge.

9. A body gesture control system for operating electrical and electronic devices, comprising:
an image sensor device capturing and generating at least two body gesture images of a user in the form of image data; and
an image processor device in communication with the image sensor device and receiving the image data, with the image processor device processing the at least two body gesture images for recognizing body gestures, with the image processor device including:
an image calculation unit calculating gesture regions of the at least two body gesture images; and
a gesture change detection unit electrically connected with the image calculation unit, with the gesture change detection unit detecting changes of the at least two body gesture images and to thereby determine a body gesture recognition signal, wherein the gesture change detection unit calculates displacements with a first position region between (x0, y0) and (x1, y1) of a first image sensor frame captured at a first time (T0) and a second position region between (x2, y2) and (x3, y3) of a second image sensor frame captured at a second time (T1), thereby receiving a change of the gesture regions; and wherein the first position region is defined by a left edge from (x0, y0) to (x0, y1), a right edge from (x1, y0) to (x1, y1), a lower edge from (x0, y0) to (x1, y0) and an upper edge from (x0, y1) to (x1, y1) and the second position region is defined by a left edge from (x2, y2) to (x2, y3), a right edge from (x3, y2) to (x3, y3), a lower edge from (x2, y2) to (x3, y2) and an upper edge from (x2, y3) to (x3, y3).

10. The body gesture control system for operating electrical and electronic devices as defined in claim 9, wherein the gesture change detection unit calculates displacements, velocities or accelerations of the body gestures.

11. The body gesture control system for operating electrical and electronic devices as defined in claim 10, wherein the gesture change detection unit utilizes position regions of the body gestures with respect to an image sensor frame captured in a different time by the image sensor device in calculating the velocities or accelerations.

12. The body gesture control system for operating electrical and electronic devices as defined in claim 9, wherein a displacement of the left edge is (x2−x0), a displacement of the right edge is (x3−x1), a displacement of the upper edge is (y2−y0) and a displacement of the lower edge is (y3−y1).

13. The body gesture control system for operating electrical and electronic devices as defined in claim 11, wherein a velocity of the left edge is (x2−x0)/(T1−T0), a velocity of the right edge is (x3−x1)/(T1−T0), a velocity of the upper edge is (y2−y0)/(T1−T0) and a velocity of the lower edge is (y3−y1)/(T1−T0).

14. The body gesture control system for operating electrical and electronic devices as defined in claim 11, wherein an acceleration of the left edge is
$a_{left\text{-}edge}(T0 \rightarrow T2) = [v_{left\text{-}edge}(T1 \rightarrow T2) - v_{left\text{-}edge}(T0 \rightarrow T1)]/(T2 - T0)$, where T0, T1 and T2 represent the first time, the second time and a third time, respectively,
an acceleration of the right edge is
$a_{right\text{-}edge}(T0 \rightarrow T2) = [v_{right\text{-}edge}(T1 \rightarrow T2) - v_{right\text{-}edge}(T0 \rightarrow T1)]/(T2 - T0)$, where T0, T1 and T2 represent the first time, the second time and the third time, respectively,
an acceleration of the upper edge is
$a_{upper\text{-}edge}(T0 \rightarrow T2) = [v_{upper\text{-}edge}(T1 \rightarrow T2) - v_{upper\text{-}edge}(T0 \rightarrow T1)]/(T2 - T0)$, where T0, T1 and T2 represent the first time, the second time and the third time, respectively, and
an acceleration of the lower edge is
$a_{lower\text{-}edge}(T0 \rightarrow T2) = [v_{lower\text{-}edge}(T1 \rightarrow T2) - v_{lower\text{-}edge}(T0 \rightarrow T1)]/(T2 - T0)$, where T0, T1 and T2 represent the first time, the second time and the third time, respectively.

15. The body gesture control system for operating electrical and electronic devices as defined in claim 11, wherein a velocity of a gesture region $v_{width_x}(T0 \rightarrow T1)$ is approximately $[(x3-x2)-(x1-x0)]/(T1-T0)$.

16. The body gesture control system for operating electrical and electronic devices as defined in claim 11, wherein a velocity of a gesture region $v_{width_y}(T0 \rightarrow T1)$ is approximately $[(y3-y2)-(y1-y0)]/(T1-T0)$.

17. The body gesture control system for operating electrical and electronic devices as defined in claim 11, wherein an acceleration of a gesture region $a_{width_x}(T0 \rightarrow T2)$ is approximately $[v_{width_x}(T1 \rightarrow T2) - v_{width_x}(T0 \rightarrow T1)]/(T2-T0)$, where T0, T1 and T2 represent the first time, the second time and a third time, respectively.

18. The body gesture control system for operating electrical and electronic devices as defined in claim 11, wherein an acceleration of a gesture region $a_{width_y}(T0 \rightarrow T2)$ is approximately $[v_{width_y}(T1 \rightarrow T2) - v_{width_y}(T0 \rightarrow T1)]/(T2-T0)$, where T0, T1 and T2 represent the first time, the second time and a third time, respectively.

19. The body gesture control system for operating electrical and electronic devices as defined in claim 9, wherein the gesture change detection unit calculates velocities of the body gestures by displacement per time, or the gesture change detection unit calculates accelerations of the body gestures by velocity per time.

20. A body gesture control system for operating electrical and electronic devices, comprising:
an image sensor device sequentially capturing and generating at least three body gesture images of a user in the form of image data, with the at least three body gesture images including at least three body part gesture images or at least three eye gesture images; and
an image processor device in communication with the image sensor device and receiving the image data, with the image processor device processing the at least three body gesture images for recognizing body gestures, with the image processor device including:
an image calculation unit calculating gesture regions of the at least three body gesture images; and
a gesture change detection unit electrically connected with the image calculation unit, with the gesture change detection unit detecting changes of the at least three body gesture images and to thereby determine a body gesture recognition signal; wherein the gesture change detection unit calculates at least one displacement of the body gestures from a first position region between (x0, y0) and (x1, y1) shown in a first image frame captured at a first time (T0) to a second position region between (x2, y2) and (x3, y3) shown in a second image frame captured at a second time (T1) of two of the at least three body gesture images with the first and second position regions being different, with the first and second times (T0, T1) being different; and wherein the gesture change detection unit further calculates a differential between the first position region of the first image frame and the second position region of the second image frame of the two of the at least three body gesture images and receiving a change of the gesture regions as the at least one displacement of the body gestures.

\* \* \* \* \*